Patented June 24, 1924.

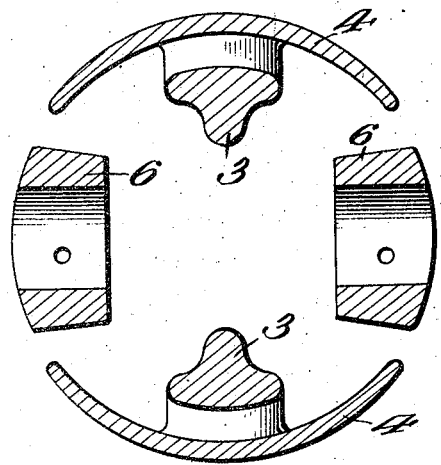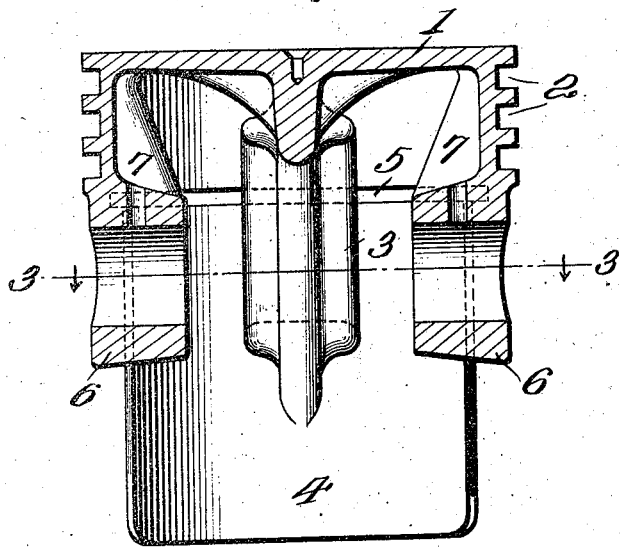

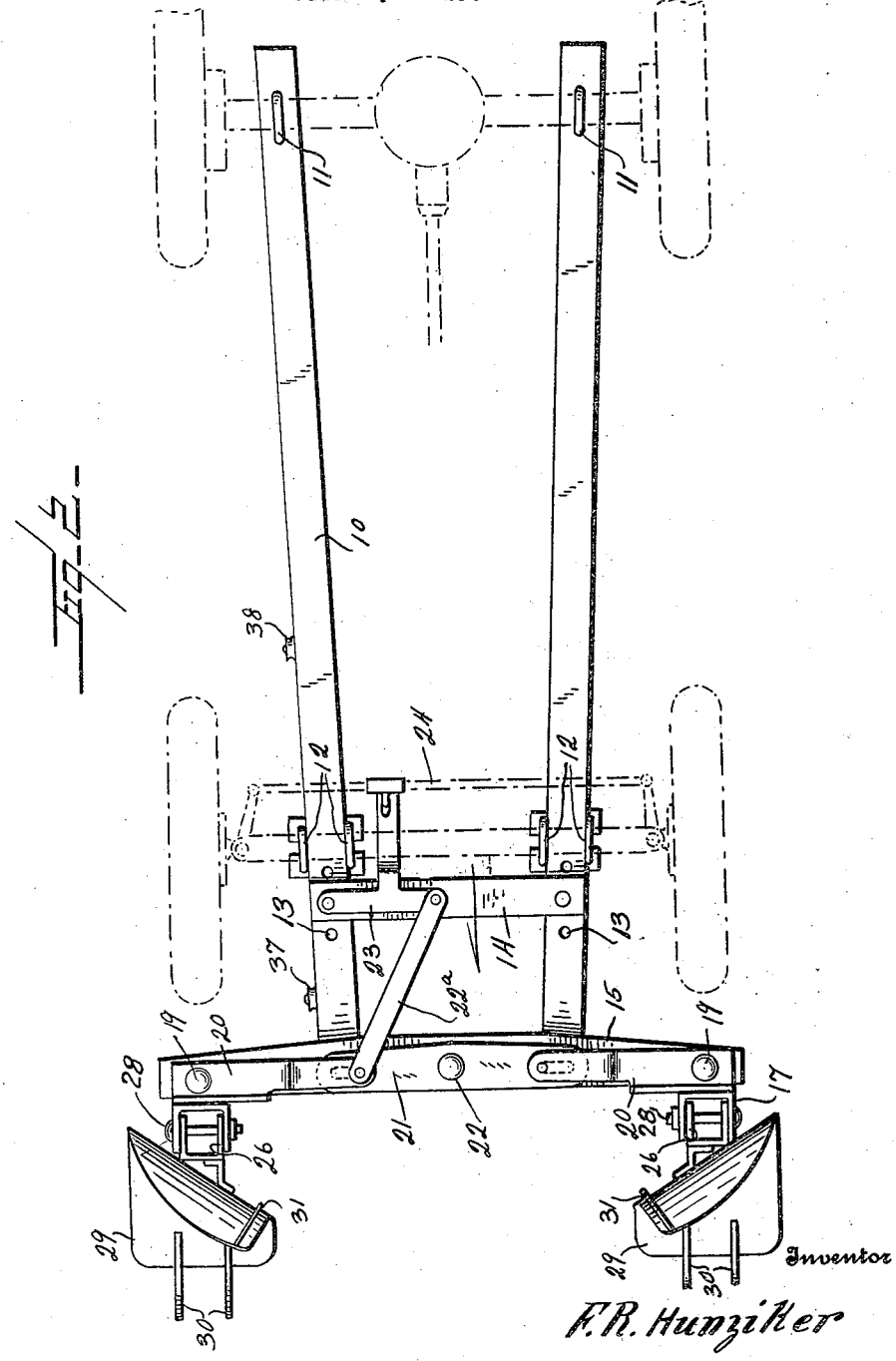

1,498,690

UNITED STATES PATENT OFFICE.

FRED R. HUNZIKER, OF TOMAHAWK, WISCONSIN, ASSIGNOR OF ONE-HALF TO JOHN H. FLOYD, OF TOMAHAWK, WISCONSIN.

SNOWPLOW FOR AUTOMOBILES.

Application filed April 29, 1922. Serial No. 557,398.

*To all whom it may concern:*

Be it known that I, FRED R. HUNZIKER, a citizen of the United States, residing at Tomahawk, in the county of Lincoln and State of Wisconsin, have invented certain new and useful Improvements in Snowplows for Automobiles, of which the following is a specification, reference being had to the accompanying drawings.

This invention relates to snow plows, and particularly to snow plows for wheel vehicles, such as motor cars, trucks, busses, and the like.

The general object is to provide a snow plow in the form of an attachment which may be readily applied to automobile or motor operated busses or the like and which carries two plows proper disposed in advance of the front wheels of the vehicle.

A further object is to provide a device of this character wherein the plows are dirigible, either by a connection to the steering bar of the vehicle, or by providing the vehicle with a set steering post for the plows.

Another object is to provide means whereby the plows may be raised and lowered into or out of operative position.

Other objects will appear in the course of the following description.

My invention is illustrated in the accompanying drawings, wherein:—

Figure 1 is a side elevation of a snow plow for automobiles constructed in accordance with my invention, the frame of the automobile being in dotted lines;

Figure 2 is a top plan view of the construction illustrated in Figure 1;

Figure 3 is a perspective view of the shaft for raising or lowering the plows;

Figure 4 is a fragmentary top plan view showing another manner of shifting the plows;

Referring to these drawings, it will be seen that my invention includes longitudinally extending supporting members 10 disposed in more or less parallel relation beneath the body of a vehicle, these supporting members 10 being connected to the rear axle housing by means of the U-shaped clamps 11 and to the front axle by means of U-shaped clamps 12. These longitudinal members are formed with a plurality of perforations 13 and extending across and connecting the members 10 is a transverse brace 14 having bolts which may be inserted in any one of the perforations 13, depending upon the length of the vehicle.

Mounted upon the forward ends of the members 10 is a transversely extending channel iron 15 to which these members 10 are bolted. These members 10 may be U-shaped in cross section or have any other desired cross section. They are bolted or otherwise connected to the upper flanges of the channel iron 15 and attached to the lower flange of each channel iron is an upwardly and rearwardly extending brace 16 which is bolted, riveted or otherwise connected to the corresponding bar 10. This channel iron 15 is connected to both of the supporting beams or members 10 and has a length equal to the distance between the front wheels of the machine or slightly greater than this distance.

Extending nearly vertically forward of the ends of the channel iron 15 are the guides 17 for the shanks of the plows. These guides may be preferably made of channel iron, though I do not wish to be limited thereto, and each guide is provided with angle irons 18 and 20 riveted, bolted or otherwise attached thereto, these angle iron sections confronting the upper and lower flanges of the channel iron 15 and being pivoted thereto by the vertical pivot bolts or pins 19. The angle iron 20, it will be seen from Figure 2, is laterally extended so as to form an arm. Each arm is pivotally connected to a lever 21 pivoted at its middle, as at 22, to the upper flange of the channel iron 15, and thus it will be seen that as this lever 21 is oscillated the channel iron guides 17 will be oscillated and that the channel iron guides will be oscillated in the same direction so that these channel iron guides are always parallel to each other.

For the purpose of actuating this lever 21, I may provide a link 22ª connected to one arm of a bell crank lever 23 pivoted upon the transverse brace 14, the other arm of this bell crank lever being connected to the transversely extending steering rod 24 of the machine so that as the machine is steered, these vertical guides 17 will be shifted in one direction or the other.

The vertical guides 17 have upper and lower slots 25, and mounted between the side flanges of each channel iron is the vertical post or shank 26 of the plow. This, as illustrated, is also made of channel iron and is longitudinally slotted at 27. Pins 28 pass through the slots 25 and 27 so that the stock, shank or post of the plow has limited vertical movement. Mounted upon the face of each post or stock is the plow 29 which extends upward and rearward and then upward and forward and is disposed in a plane at an inclination to the face of the stock. Each plow is supported by one or more runners or shoes 30, preferably two in number, as if there is only one shoe 30 it is very liable to run in a rut. The rear face of the plow adjacent its inside face is formed with the outwardly projecting flange 31. The plows and stocks or posts may be raised and lowered by any suitable mechanism under the control of the driver of the vehicle, and I have illustrated for this purpose a transversely extending shaft 32 which is mounted in bearings upon the upper ends of the guides 17, the shaft being formed with two forwardly projecting arms 33, each of which is connected by a number of links 34 to the corresponding plow stock.

An arm 35 projects rearwardly from this shaft 32, and attached to this arm is the vertically extending cable 36 which extends downward beneath the pulley 37 mounted upon one of the bars 10, then extends rearward and beneath the pulley 38, then upward through the floor of the car into position adjacent the driver's seat and is there provided with a handle 39. By drawing upward on the handle 39, the chain, cable or other flexible connection will be pulled, which will act to raise the plows. Any suitable locking device may be then engaged by the handle so as to hold the plows raised, and when the handle is released the plows will fall to their plowing position.

Preferably the guides 17 will each be braced by a brace 40 which is hingedly connected to the end of the frame bar A of the machine, the forward end of the brace having a socket 41 to receive a ball 42 on the corresponding guide. This will permit a relative motion of the guides and the car. This frame beam A is ordinarily connected to the elliptical spring B at its forward end, this spring B in turn resting on the front axle of the car beneath which the bars 10 pass. This connection, while thus bracing the plow over the body of the car, permits the body of the car to rise and fall independently of the chassis in the usual manner.

Preferably the longitudinal members 10 will be connected to the frame bars A by means of coiled contractile springs 43 and turnbuckles 44, these turnbuckles being connected to clips 45 embracing the corresponding bars 10, the forward end of the spring 44 being connected to a clip or other suitable means engaging the frame bars A. These springs 43 keep the body of the car from lunging ahead when the shovels or plows strike a large snow drift. In other words, they hold the plow in a normal position but permit the plow to yield when it strikes a drift without putting a too great strain upon the car.

I have heretofore described the plows as being oscillated by connection to the steering rod 24 of the car but I do not wish to be limited to this, as under some circumstances, as for instance where the device is to be applied to very heavy cars, it may be desirable to provide means whereby the driver can shift the plows without putting a strain upon the steering gear of the machine. In Figure 4, I show such a construction, wherein the plow steering post is designated 44 and this steering post being provided with a hand wheel or like means whereby it may be operated and with a sprocket wheel or pulley 45. Passing around this sprocket wheel or pulley is a sprocket chain, cable or other flexible connection 46 which is crossed in front of the steering post, the extremities of this cable or flexible connection 46 extending to the ends of the lever 21.

It will be seen that with this device a rotation of the steering post will act to coincidently shift both plows in the same direction. This shifting of the plows is necessary in order that the machine may turn corners and the plows be kept immediately in front of the front wheels and be steered with these front wheels. In the actual practice of this invention to a twenty-passenger Oldsmobile bus, the shovels or plows are three and one-half feet high and three feet wide, but these dimensions will, of course, vary with the different types of car to which the snow plow is applied, the shovels being only about twelve inches wide and three feet high for a Ford.

While I have illustrated details of construction which I have found to be particularly of value in actual practice, I do not wish to be limited to this, as it is obvious that many changes might be made in these details and in the arrangement of parts without departing from the spirit of the invention as defined in the appended claims.

I claim:—

1. The combination with an automobile having front wheels, of a plow supporting frame mounted upon the chassis of the automobile and including vertically extending guides disposed immediately adjacent the front wheels of the vehicle, snow plows mounted upon said guides and extending in front of the front wheels, the plows being vertically movable within the guides and the guides being oscillatably mounted for lateral oscillation, and manually operable means for raising or lowering the plows and for oscillating the guides.

2. The combination with an automobile having front steering wheels, of a snow plow therefor comprising a frame mounted upon the chassis of the automobile, vertically disposed guides pivotally mounted upon the frame at its forward end for lateral oscillation, pivotally disposed plow stocks slidingly engaging said guides for vertical movement, plows mounted upon said plow stocks, and manually operable means for oscillating said guides and raising or lowering the plow stocks.

3. The combination with an automobile of a snow plow mounted upon the chassis of the vehicle and including vertically extending guides having lateral oscillation, plow stocks slidingly engaging said guides for vertical movement, plows carried upon said plow stocks, each plow having a plurality of longitudinally extending shoes at its lower end, means for manually oscillating said guides, and means for raising or lowering the plows.

4. The combination with an automobile having front steering wheels and a transversely extending steering rod, of vertical guides oscillatably supported upon the chassis of the automobile for lateral oscillation, plows having plow stocks disposed in said guides and mounted for vertical movement therein, arms extending laterally from the guides, a lever pivoted at its middle and having its ends connected to said arms, an operative connection between said lever and the steering rod of the machine, and manually operable means for raising or lowering said plow stock in the guides.

5. A snow plow of the character described including longitudinally extending supporting bars adapted to be attached to the chassis of an automobile, vertical guides hinged to the ends of said supporting bars for lateral oscillation, plows having vertical plow stocks disposed in said guides for vertical movement, contractile springs adapted to connect the longitudinal bars to the frame of the automobile and resist impact on the plows, manually operable means for raising or lowering the plow stocks and plows, and manually operable means for oscillating the guides.

6. The combination with an automobile having dirigible front wheels, of snow plows mounted one in front of each front wheel and adjacent thereto for lateral oscillation independent of the wheel, means whereby the plows may be oscillatably shifted, and means whereby the plows may be raised or lowered.

7. A snow plow attachment for automobiles comprising longitudinally extending frame bars operatively connected to each other and adapted to be connected to the chassis of an automobile, a transverse bar connecting said longitudinal bars, vertical channel-shaped guides pivotally connected to the ends of the transverse bar, vertical plow stocks disposed in said guides and vertically shiftable therein, the guides and plow stocks being longitudinally slotted, pins passing through said slots, a plow mounted on each plow stock, a transverse shaft operatively supported upon the guides and having forwardly extending arms flexibly engaged with the upper ends of the plow stocks, and manually operable actuating devices connected to said shaft whereby it may be oscillated to raise or lower the plows.

8. The combination with an automobile having front wheels and a pair of snow plows adapted to be disposed one in front of each front wheel, and a plow supporting frame adapted to be disposed beneath the body of the automobile and detachably engaged with the rear axle housing and with the front axle.

9. The combination with an automobile having front wheels and a pair of snow plows adapted to be disposed one in front of each front wheel, and a plow supporting frame adapted to be disposed beneath the body of the automobile and detachably engaged with the rear axle housing and with the front axle, the plows being detachable from the frame.

In testimony whereof I hereunto affix my signature.

FRED R. HUNZIKER.